Jan. 25, 1927. 1,615,490
A. H. SWEET
BRAKE BAND LINING
Filed August 30, 1926
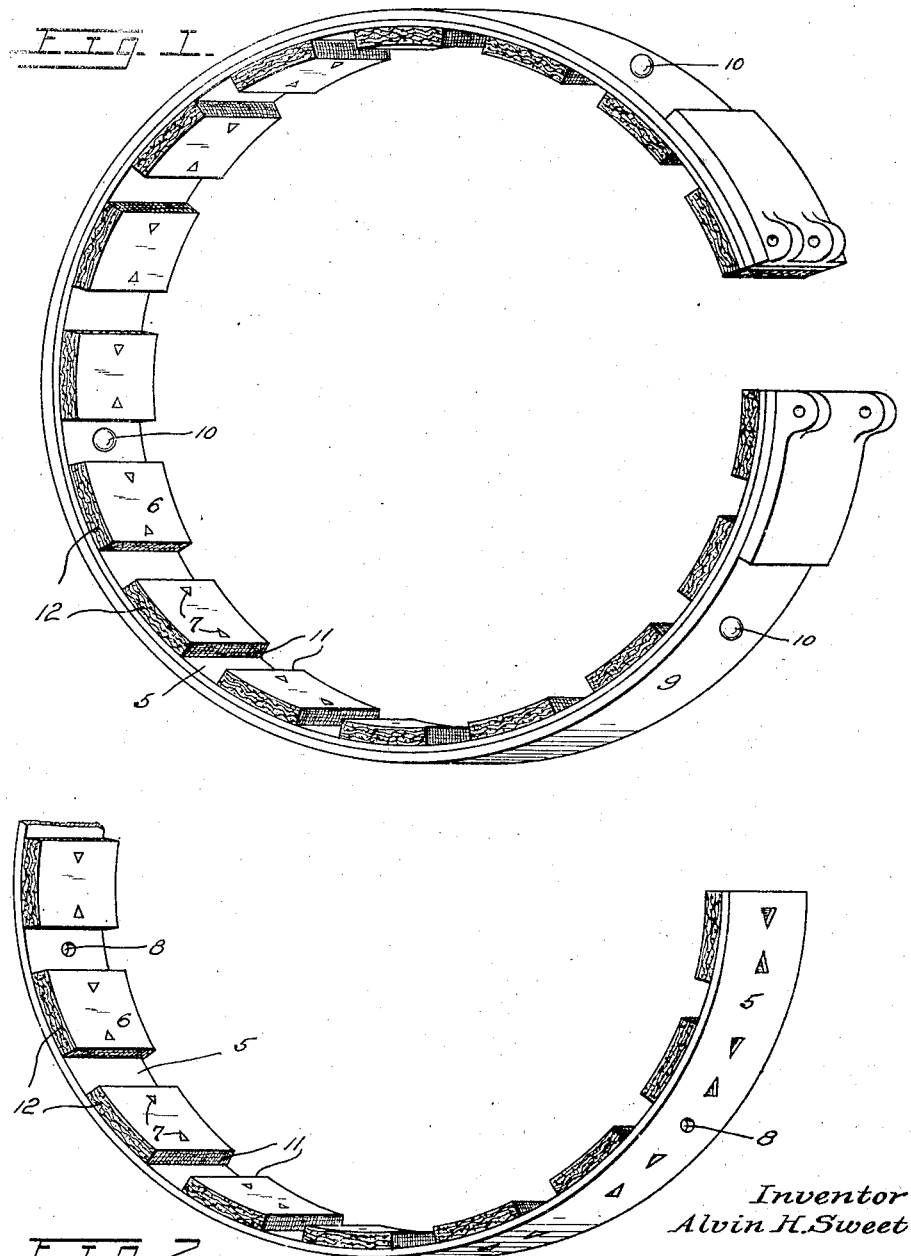
Inventor;
Alvin H. Sweet,
per M.W. Crandall
Attorney.

Patented Jan. 25, 1927.

1,615,490

UNITED STATES PATENT OFFICE.

ALVIN H. SWEET, OF LOS ANGELES, CALIFORNIA.

BRAKE-BAND LINING.

Application filed August 30, 1926. Serial No. 132,588.

In this specification, and the accompanying drawing, I shall describe and show a preferred form of my invention, and specifically mentioned certain of its more important objects. I do not limit myself to the forms disclosed, since various changes and adaptations may be made therein without departing from the essence of my invention as hereinafter claimed; and objects and advantages, other than those specifically mentioned, are included within its scope.

My lining comprises a flexible strip 5 bands and its principal objects are; first, to provide an improved device of this nature that may readily be inserted or removed from a brake band; and, second, to furnish a brake band lining that will combine the characteristics of great gripping power with relatively long life.

My objects are attained in the manner illustrated in the accompanying drawings which show a preferred embodiment of my invention, and in which—

Figure 1 is a perspective view of a brake band with my improved lining installed therein; and Figure 2 is a fragmentary perspective view of the lining by itself.

Similar reference characters refer to similar parts throughout both views.

My lining comprises a flexible strip 5 which preferably is metallic. On the inside surface of this strip are a multiplicity of spaced sections 6 of woven friction material. These sections are attached to the strip by first pressing triangular points 7 inwardly from the material of the strip, then mounting the friction sections on these points, and finally bending the points over upon the friction material to retain the friction sections in place.

The strip is provided with holes, as at 8, whereby it may be readily attached to a brake band 9 by rivets 10.

A distinguishing feature of my invention over somewhat similar prior constructions is that the friction sections 6 are so placed on strip 5 that the warp of the fabric is crosswise of the strip. The friction material thus presents selvedges 11 running crosswise of the strip, and the woof threads run parallel to the strip. In this construction therefore the only raw edges of the friction sections are their ends, as at 12. These ends are not subjected to wear and hence ravelling of the friction fabric is greatly reduced in this manner. In prior constructions, where the friction fabric is cut in sections and mounted upon the flexible strip with the warp threads parallel to the strip, the woof threads are crosswise and ravelling quickly takes place as a result of the action of the brake drum upon the raw edges of the friction sections. Obviously therefore the life of the friction material is greatly increased by the improved construction herein disclosed.

Having thus fully described my invention, I claim:

1. A brake band lining comprising a flexible strip having spaced sections of woven friction fabric attached to the inner surface of the strip; the warp threads of said fabric being transverse to the strip.

2. A brake band lining comprising a flexible strip having spaced sections of woven friction fabric attached to the inner surface of the strip; said sections having selvedges transverse to the strip.

3. A brake band lining comprising a flexible strip adapted for mounting within a brake band and having spaced sections of woven friction fabric attached to the inner surface of the strip; said sections having selvedges and warp threads transverse to the strip.

ALVIN H. SWEET.